United States Patent [19]

Fitzgerald et al.

[11] Patent Number: 5,123,000
[45] Date of Patent: Jun. 16, 1992

[54] OPTICAL DISK CARTRIDGE HANDLING APPARATUS

[75] Inventors: Timothy P. Fitzgerald, Minneapolis; David J. Rother, Hastings; Darryl T. Wrolson, Chanhassen; Richard H. Nelson, Richfield; Robert E. Takala, Minnetonka, all of Minn.

[73] Assignee: International Data Engineering, Inc., Minneapolis, Minn.

[21] Appl. No.: 602,631

[22] Filed: Oct. 24, 1990

[51] Int. Cl.$^5$ .................. G11B 17/00; G11B 5/48; G11C 13/04; F11B 17/22
[52] U.S. Cl. ......................... 369/36; 369/34; 369/35; 369/38; 369/191; 360/92; 360/98.04
[58] Field of Search ............. 369/34, 35, 36, 38, 369/178, 191, 202, 204; 360/292, 90, 91, 92, 93, 98.04, 98.06, 99.06

[56] References Cited

U.S. PATENT DOCUMENTS

| | | | |
|---|---|---|---|
| 4,607,354 | 8/1986 | Ishibashi et al. | 369/36 |
| 4,608,679 | 8/1986 | Rudy et al. | 369/36 |
| 4,787,074 | 11/1988 | Deck et al. | 369/36 |
| 4,853,916 | 8/1989 | Tomita | 369/36 |
| 4,878,137 | 10/1989 | Yamashita et al. | 360/98.06 |

Primary Examiner—Stuart S. Levy
Assistant Examiner—Christopher R. Glembocki
Attorney, Agent, or Firm—Palmatier & Sjoquist

[57] ABSTRACT

An optical disk cartridge handling apparatus for storing, handling, reading and writing of optical disks contained in cartridges which store data for a host computer. The apparatus comprises an import/export element for loading and unloading cartridges into the apparatus. A cartridge store or library with slots therein stores the cartridges. The topmost slot initially receives the cartridges from the import/export element. A flipper mechanism is adapted to receive one of the cartridges from either the cartridge store or an optical disk drive. The flipper mechanism is adapted to invert or flip the cartridge and locate the cartridge adjacent the front of either the cartridge store or the optical disk drive. A picker mechanism moves the cartridge into and out of the flipper mechanism from either the cartridge store or the optical disk drive. Locating mechanisms are also provided for moving or locating the flipper and picker mechanisms. A drive loader mechanism is located in front of the optical disk drive for mechanically inserting the cartridge into the drive from the flipper mechanism. Optical sensors provide the apparatus with information as to the locations and orientations of the cartridges and the flipper, picker and drive loader mechanisms.

20 Claims, 11 Drawing Sheets

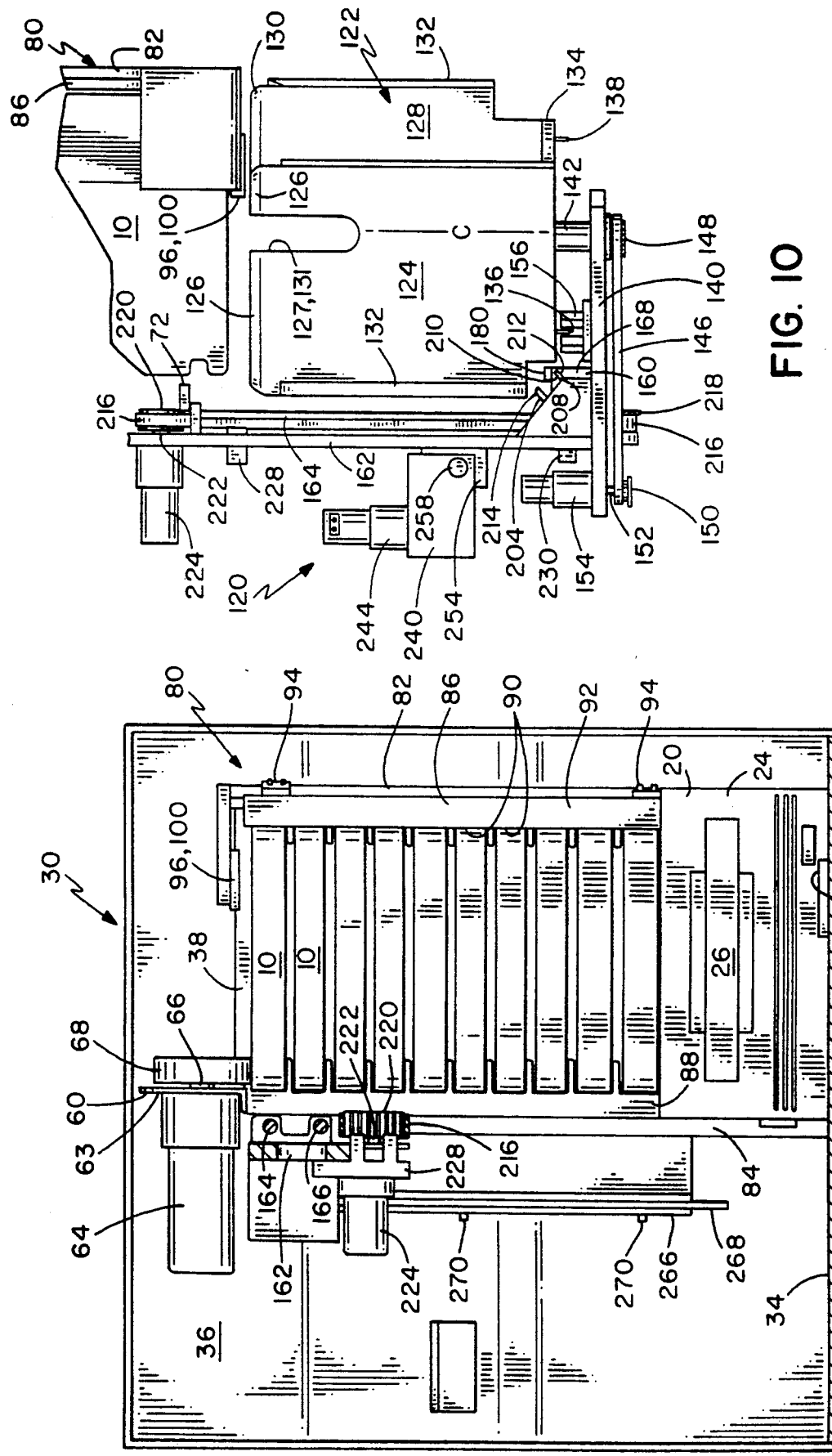

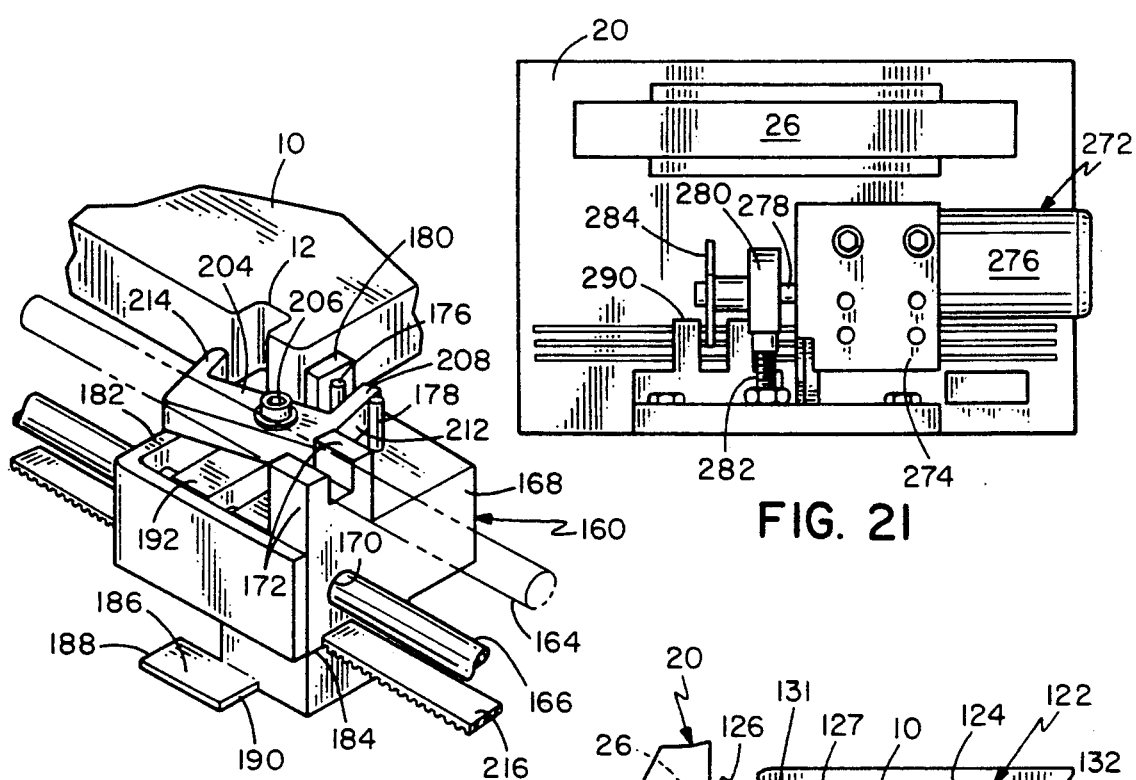
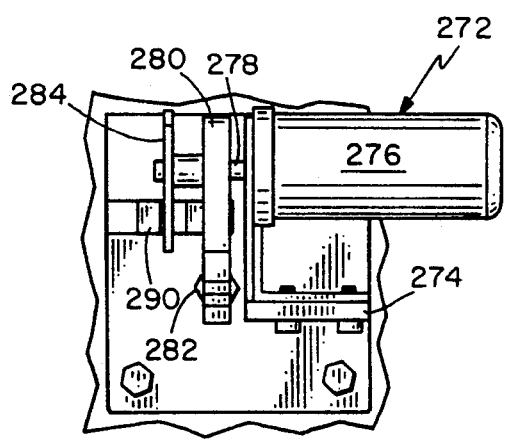
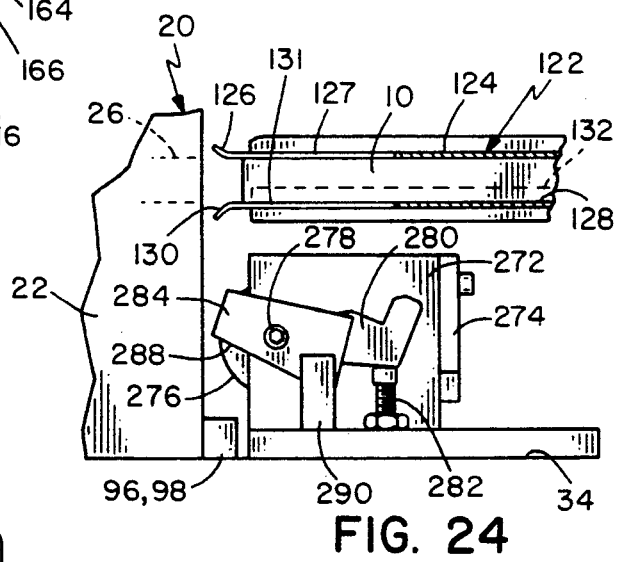
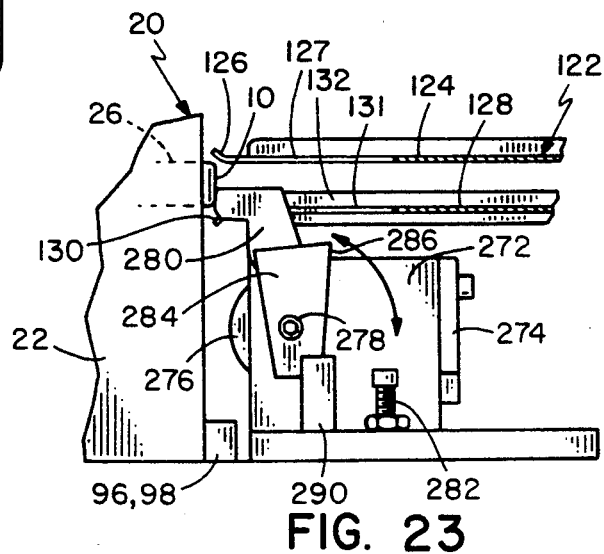

OPTICAL DISK CARTRIDGE HANDLING APPARATUS

BACKGROUND OF THE INVENTION

This invention relates to storage and handling of disk cartridges and more particularly to an optical disk cartridge handling apparatus which stores and handles optical disk cartridges for the manipulation of data by a host computer.

The storage of data in magnetic media, such as floppy disks or tapes, is well known. However, optical disks have been found to be highly advantageous over the magnetic media. This is so because the optical disks have high degrees of integrity and data storage capabilities together with a high level of sensitivity as well as environmental toughness.

As shown in FIG. 1, optical disks are each typically stored within an optical disk cartridge 10. The cartridge 10 includes pick notches 12 which assist in orienting, loading and removal of a cartridge 10 into and out of an optical disk drive 20. Optical disks are readily available in the marketplace such as from Sony Corporation of Tokyo, Japan.

The optical disk within the cartridge 10 typically has a side A and side B identified by "A" or "B" on the protective cartridge and a sliding door which permits the drive 20 to gain access to one side of the optical disk within the protective cartridge 10. Typically, the cartridge 10 must be removed and inverted or flipped with reinsertion for the drive 20 to read side "B" or the side opposite side "A." This is typically required because most drives 20 have only one laser thereby requiring the disk to be flipped over for reading or writing the other side of the disk.

Optical disk drives or the data transfer means 20 are currently available in the market. Five such available drives 20 that will illustratively work with the apparatus 30 disclosed and claimed herein are RICOH 5030E REWRITABLE, TOSHIBA WM-D070 WORM, PIONEER DD-U5001 WORM, SONY SMO D-501 REWRITABLE, and MAXOPTIX TAHITI REWRITABLE. The optical disk drives 20 typically have a housing 22, a front panel 24 and a slot 26 in front panel 24 through which the optical disk cartridge 10 is inserted and ejected.

The reading and writing of data stored on the optical disk within cartridge 10 is performed by the drive 20 under the control of a host computer.

There is a need for an optical disk cartridge handling apparatus that will operate as a library to store optical disk cartridges and which will place the cartridges within a drive 20 as well as remove and replace the cartridges in their storage location without the need for any manual assistance by the operator of the host computer.

SUMMARY OF THE INVENTION

An optical disk cartridge handling apparatus for storing, handling, reading and writing of optical disks contained in cartridges which store data for a host computer. The apparatus comprises an import/export element for loading and unloading cartridges into the apparatus. A cartridge store or library with slots therein stores the cartridges. The topmost slot initially receives the cartridges from the import/export element. A flipper mechanism is adapted to receive one of the cartridges from either the cartridge store or an optical disk drive. The flipper mechanism is adapted to invert or flip the cartridge and locate the cartridge adjacent the front of either the cartridge store or the optical disk drive. A picker mechanism moves the cartridge into and out of the flipper mechanism from either the cartridge store or the optical disk drive. A locating mechanism is also provided for moving or locating the flipper and picker mechanisms. A drive loader mechanism is located in front of the optical disk drive for mechanically inserting the cartridge into the drive from the flipper mechanism. Optical sensors provide the apparatus with information as to the locations and orientations of the cartridges and the flipper, picker, locating and drive loader mechanisms.

A principal object and advantage of the optical disk cartridge handling apparatus is that it provides for the automated storing, handling, reading and writing of optical disks under the control of a host computer without the need for any manual assistance.

Another advantage of the present invention is its unique compact size, accuracy and smoothness in storing, handling, reading and writing optical disks stored in cartridges within the apparatus.

Another object and advantage of the present invention is its high level performance in accessing and handling the mass storage of data contained within the apparatus in relatively little time.

BRIEF DESCRIPTION OF THE DRAWINGS

FIG. 9 is a cross-sectional view taken along lines 9—9 of FIG. 6;

FIG. 10 is a top plan view of the media transport element;

FIG. 20 is an enlarged perspective view of the picker mechanism;

FIG. 21 is a front elevational view of an optical disk drive mounted in the apparatus with a drive loader mechanism shown in front of the drive;

FIG. 22 is a top plan view of the drive loader mechanism;

FIG. 23 is a side elevational view of a cartridge in the cross-sectioned flipper mechanism located above the drive loader mechanism and in front of the optical disk drive; and;

FIG. 24 is a side elevational view of a drive loader mechanism pushing a cartridge into the optical disk drive.

DESCRIPTION OF THE PREFERRED EMBODIMENT

Figure 1:
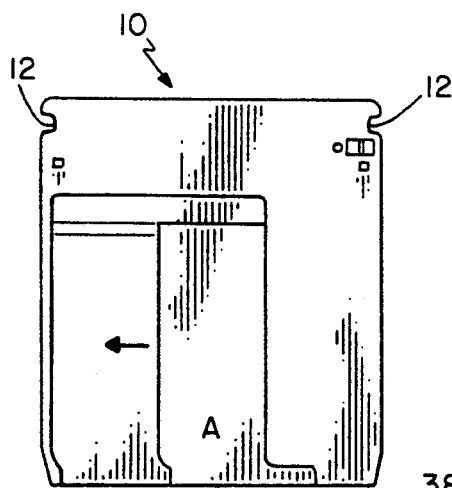
FIG. 1 is a plan view of side A of an optical disk cartridge.
Figure 3:
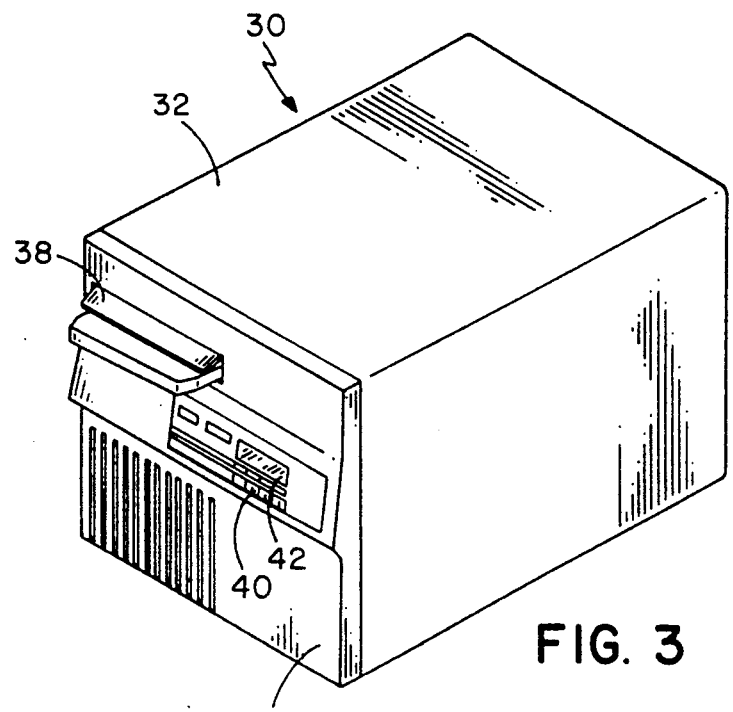
FIG. 3 is a front perspective view of the optical disk cartridge handling apparatus.
Figure 2:
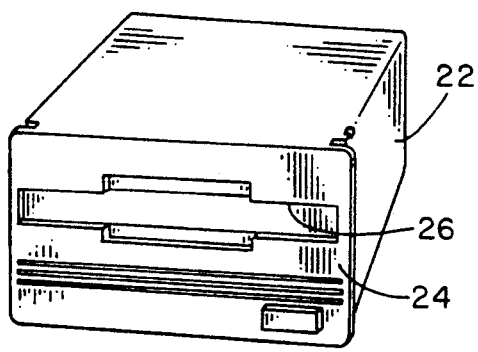
FIG. 2 is a perspective view of an optical disk drive or data transfer element.
Figure 4:
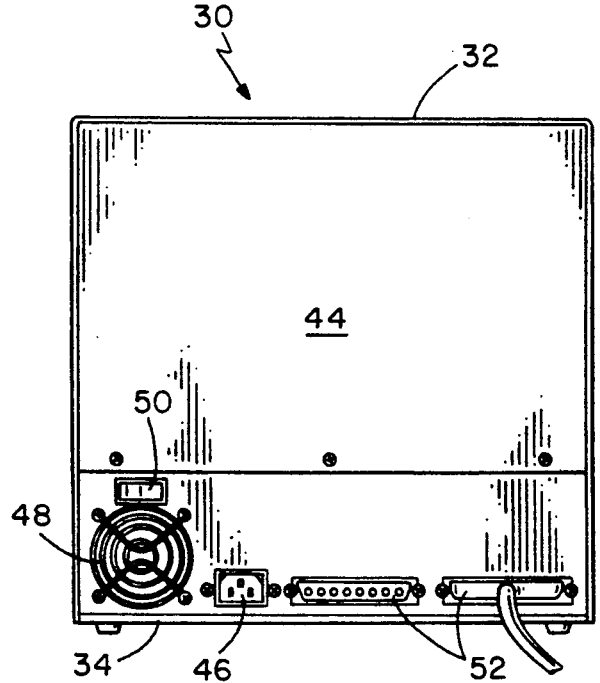
FIG. 4 is a rear elevational view of the apparatus.
Figure 5:
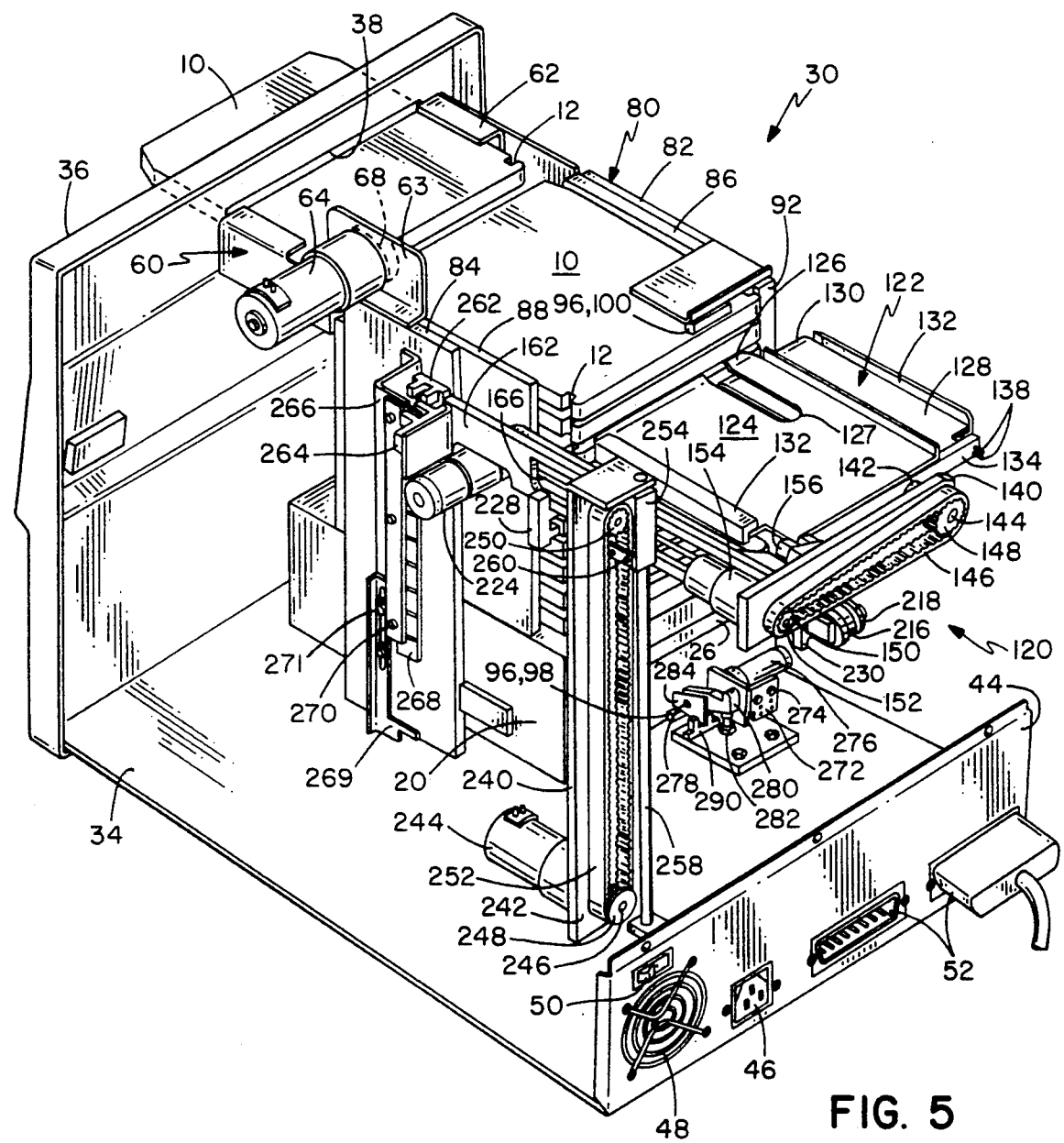
FIG. 5 is a rear perspective view of the apparatus with its housing removed.
Figure 6:
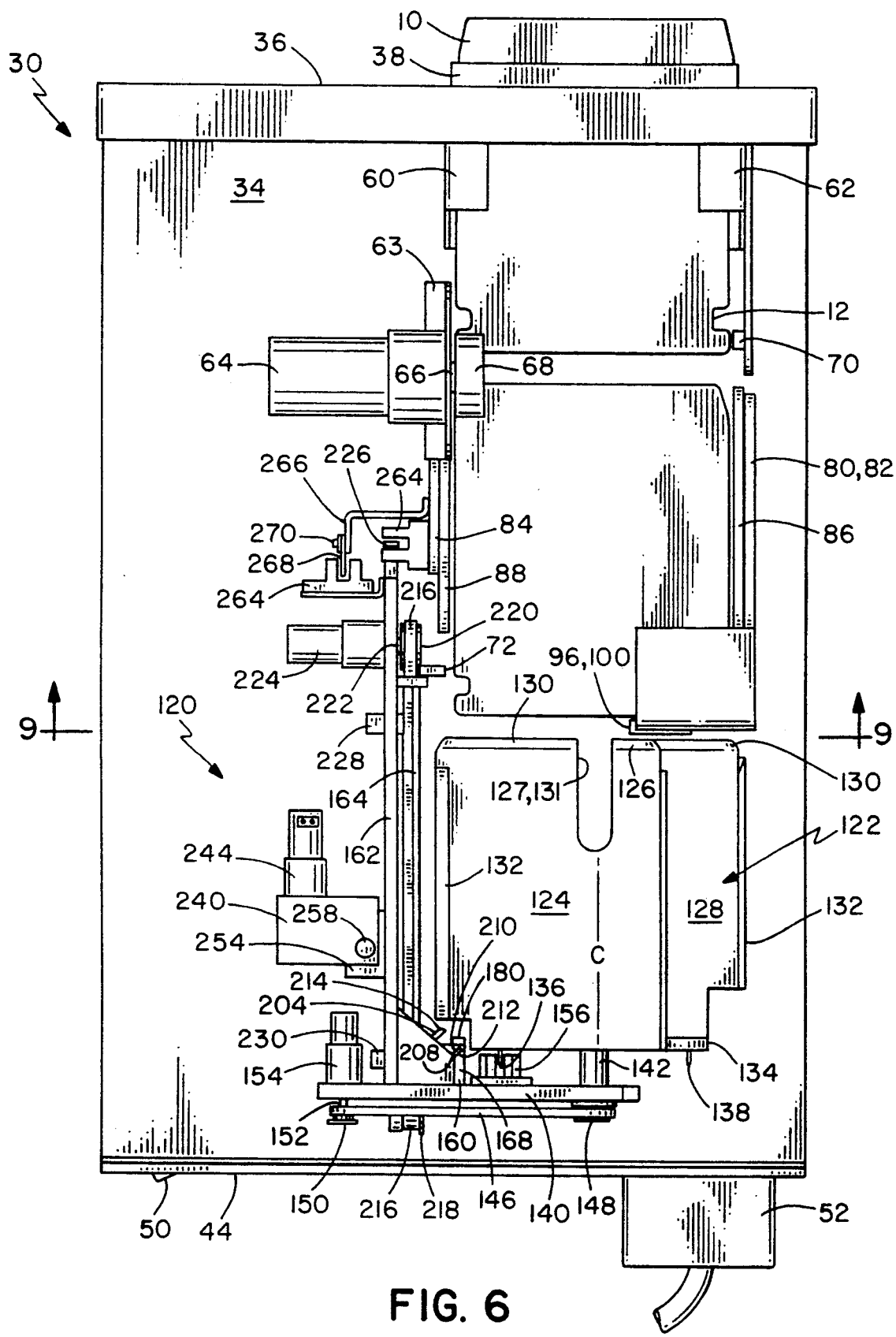
FIG. 6 is a top plan view of the apparatus.
Figure 7:
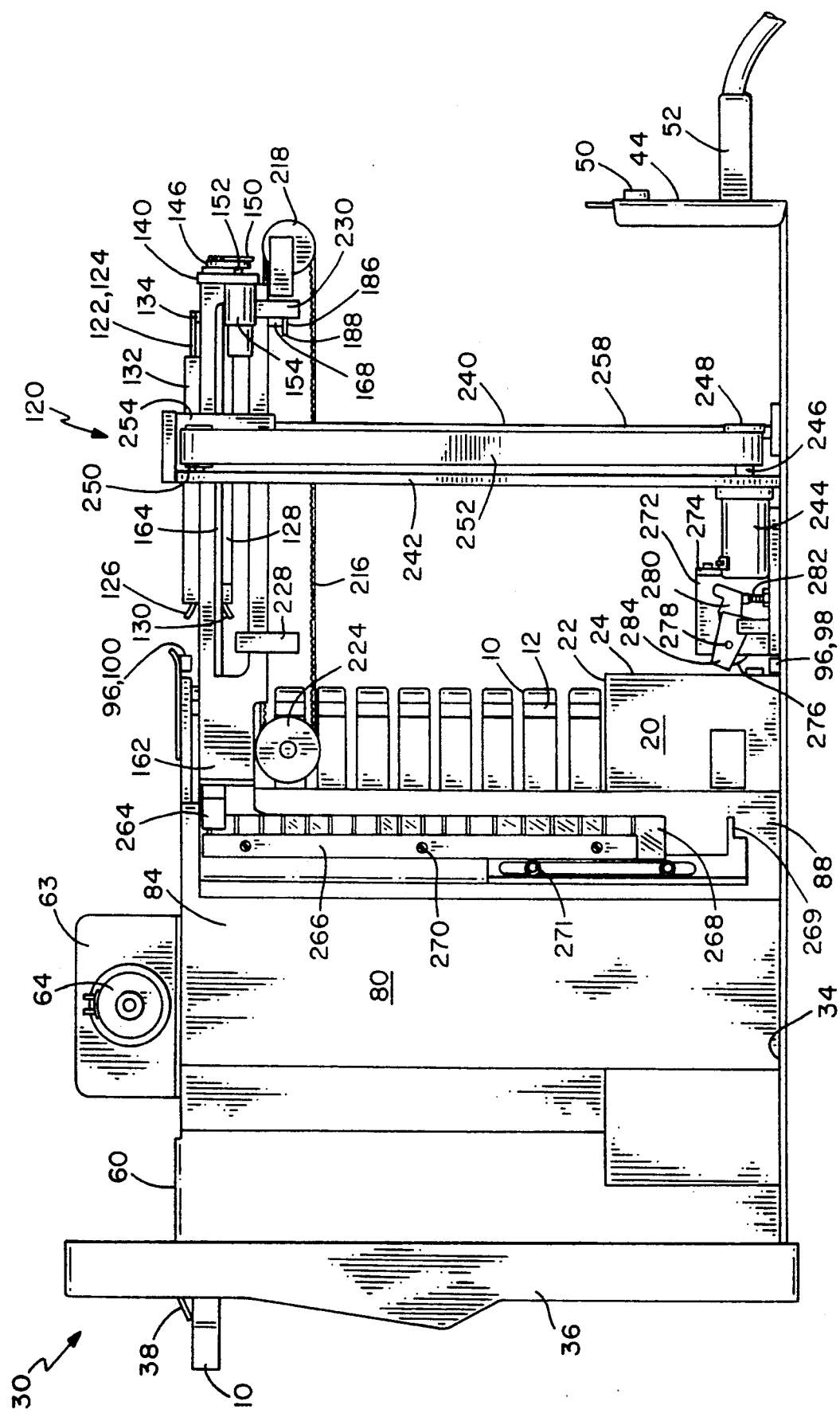
FIG. 7 is a right side elevational view of the apparatus.
Figure 8:
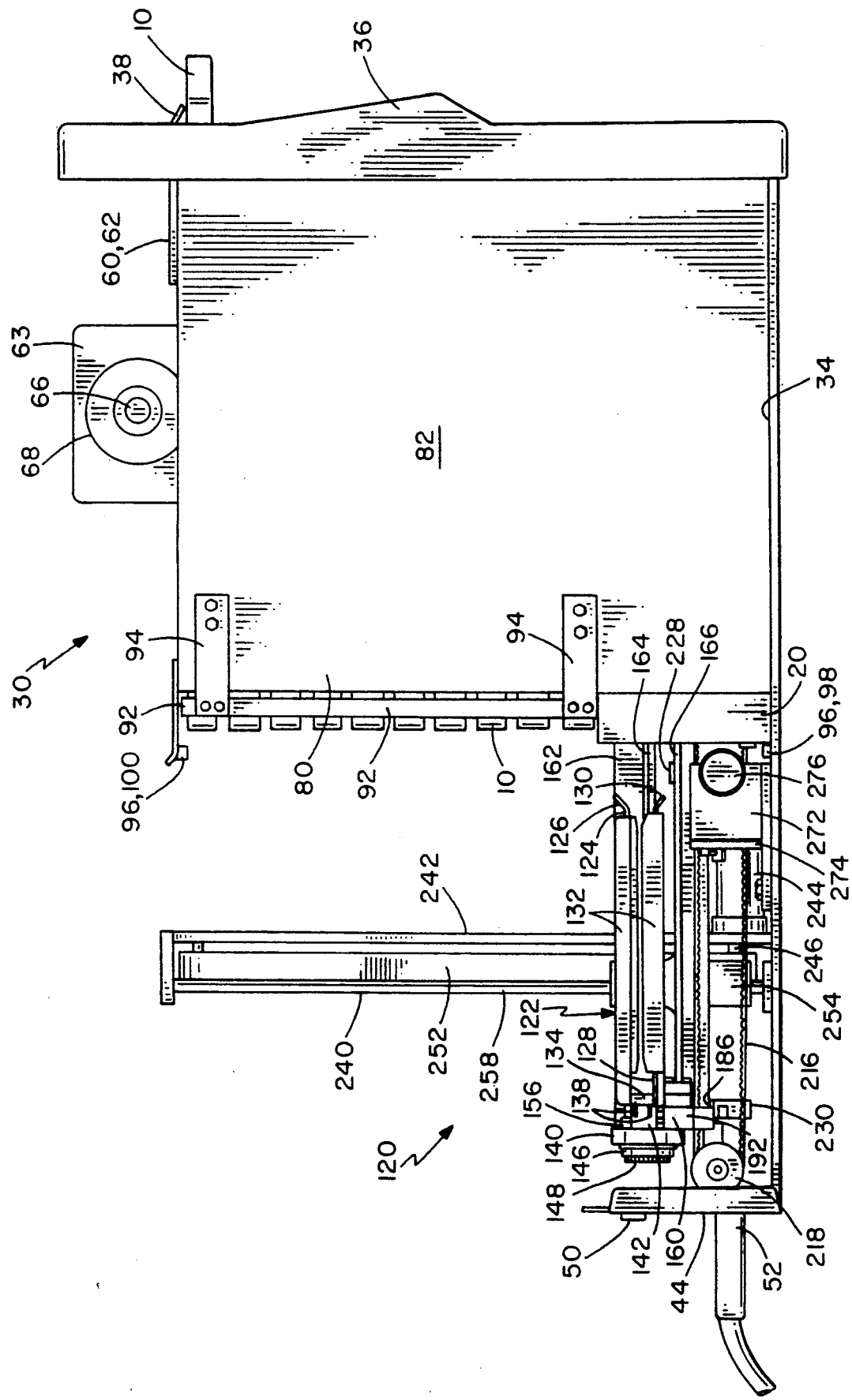
FIG. 8 is a left side elevational view of the apparatus.
Figure 11:
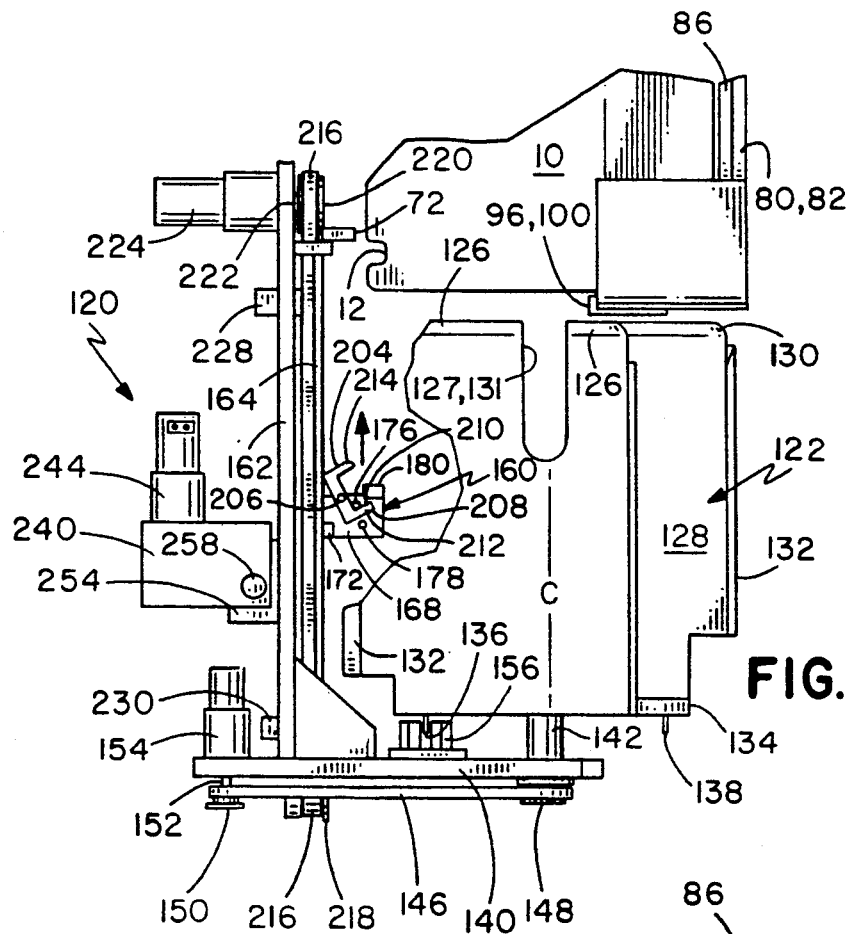
FIG. 11 is a top plan view of the media transport element with the picker mechanism approaching a cartridge.
Figure 12:
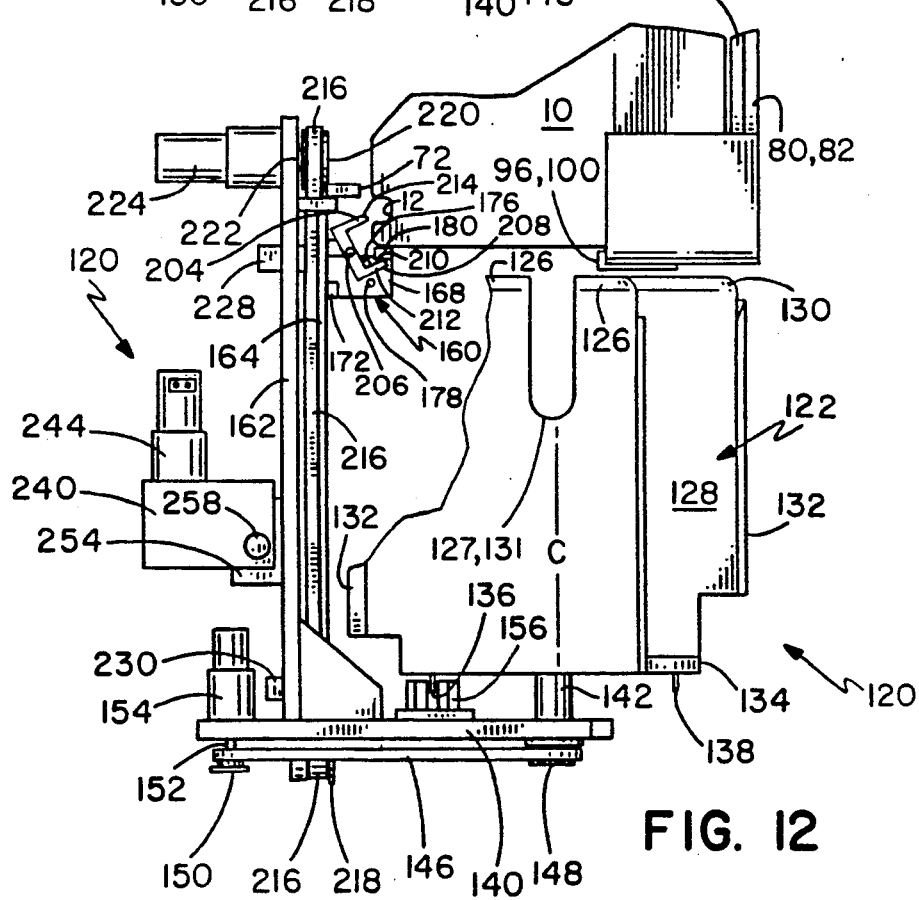
FIG. 12 is a top plan view of the media transport element with the picker mechanism about to engage the cartridge.
Figure 13:
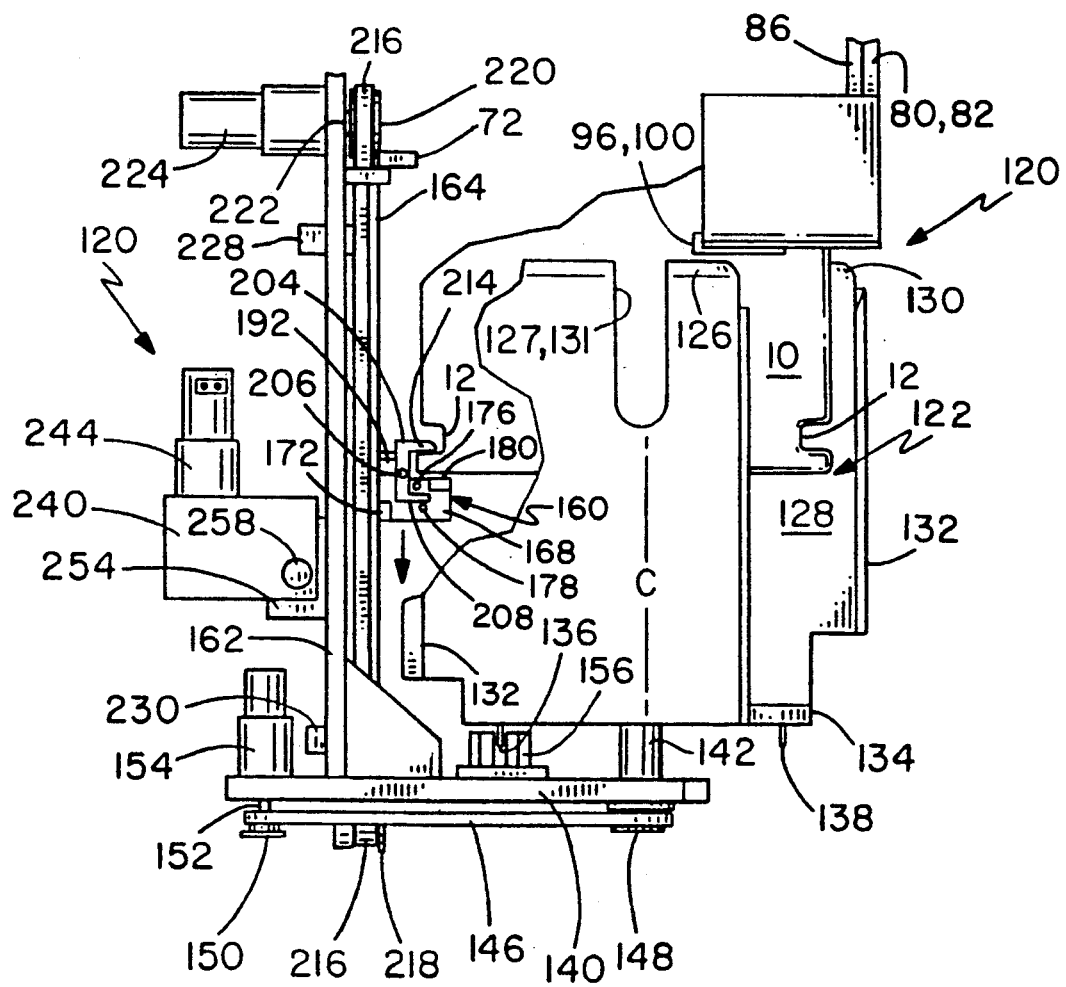
FIG. 13 is a top plan view of the media transport element with the picker mechanism engaged with a cartridge and drawing the cartridge into the flipper mechanism.
Figure 14:
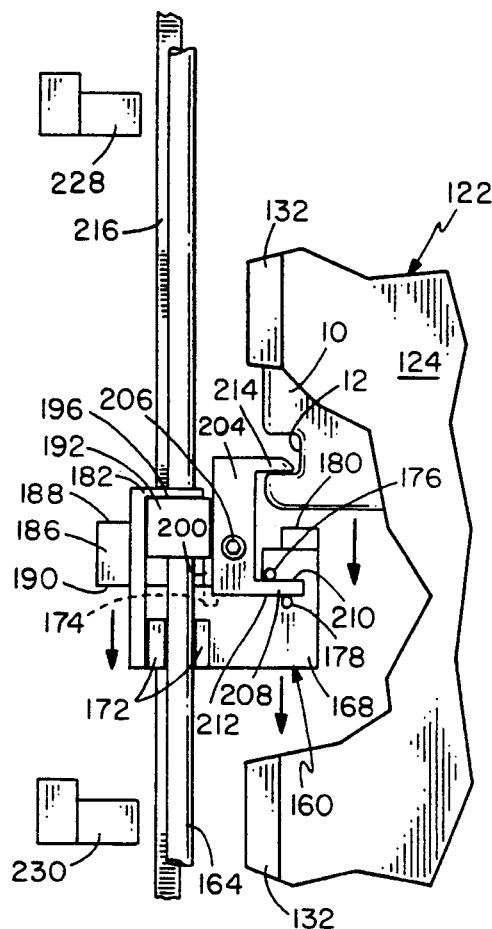
FIG. 14 is an enlarged top plan view of the picker mechanism drawing a cartridge into the flipper mechanism.
Figure 16:
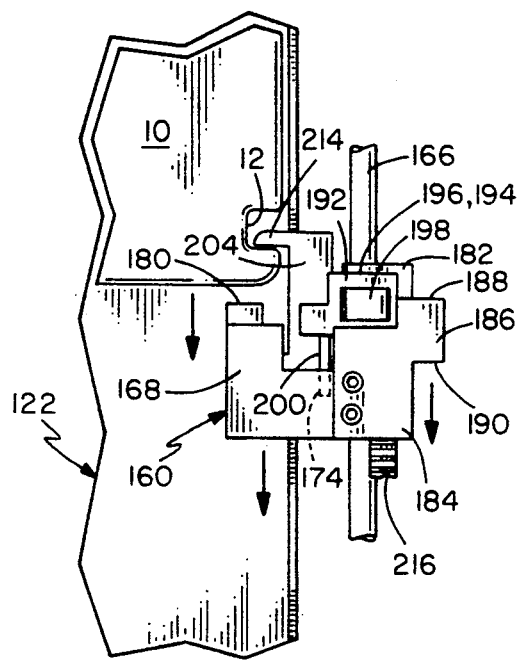
FIG. 16 is an enlarged bottom plan view of the picker mechanism engaged, with and drawing a cartridge into the flipper mechanism.
Figure 15:
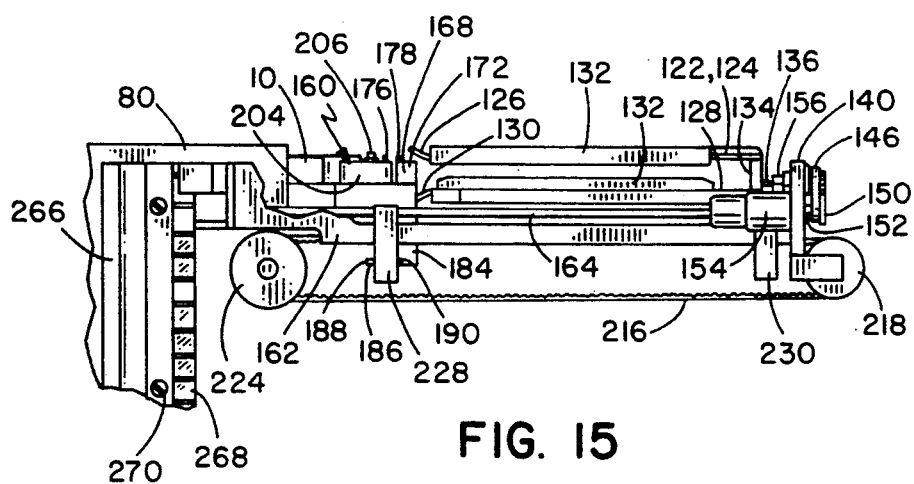
FIG. 15 is a side elevational view of the media transport element with the picker mechanism engaging a cartridge.
Figure 17:
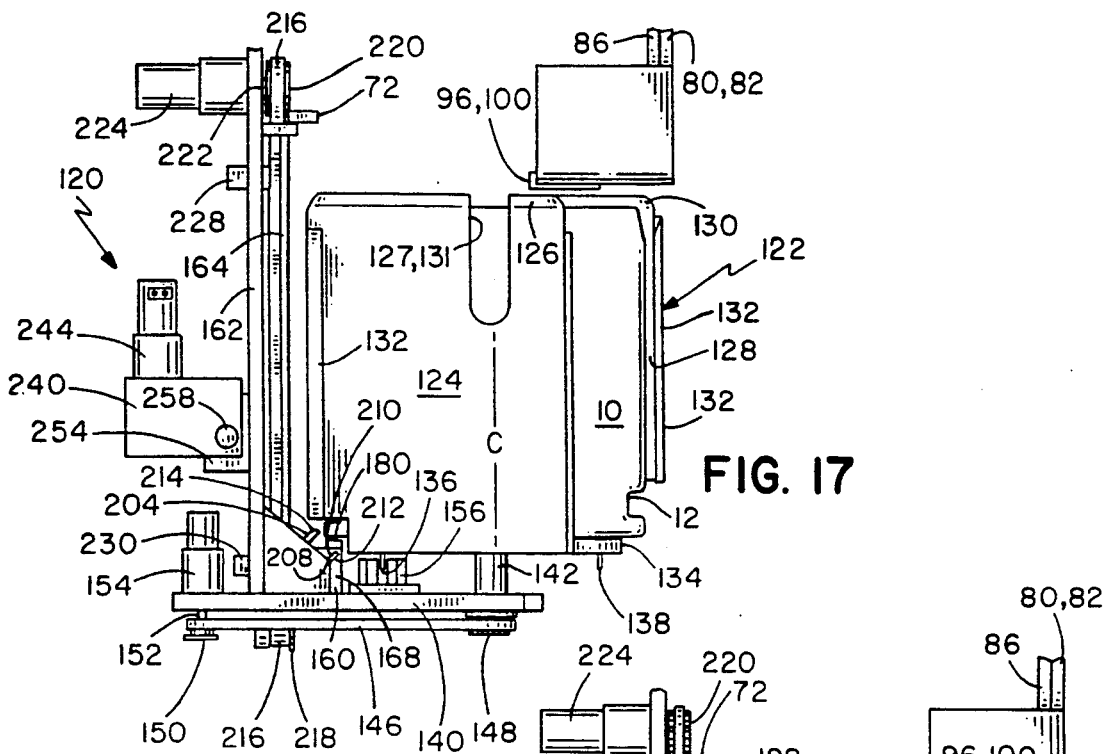
FIG. 17 is a top plan view of the media transport element with the cartridge completely drawn into the flipper mechanism and the picker mechanism retracted.

The optical disk cartridge handling apparatus 30 has an outer housing 32 which is supported by a base plate 34. A front panel 36 offers to the user a door 38, key pad 40 and display 42. The back wall 44 has therein a power plug 46, fan 48 for cooling the apparatus 30 and a power switch 50. SCSI plug and connectors 52 connect the apparatus to a host computer (not shown) which controls the operation of the apparatus by way of the SCSI bus using SCSI common command set commands.

Referring to FIGS. 5-10, the major components of apparatus 30 may generally be seen with housing 32 removed. The optical disk cartridge handling apparatus 30 generally comprises an import/export element 60, cartridge or media store 80, flipper mechanism 122, picker mechanism 160, a locating or lift mechanism 240 and drive loader mechanism 272. Any commercially available optical disk drive 20 is suitable within the apparatus 30 centrally mounted on base plate 34.

The import/export element 60 is located on the inside of front panel 36 just behind the door 38. A carriage 62 is adapted to receive an optical disk cartridge 10. A motor bracket 63 is adjacent carriage 62 and supports an import/export motor 64. Motor 64 has a rotatable drive shaft 66 supporting a rubber tire or wheel 68 which will readily grip the flat surface of an optical disk cartridge 10. Tire 68 will move a cartridge 10 in or out of carriage 62 in either direction.

An optical or photointerrupter sensor optionally may be located within import/export element 60 and positioned so that the cartridge 10 will pass between the emitter and collector sensor 70. Such sensors are sometimes referred to as "optos" in the industry. Sensor 70 can sense the presence of the cartridge 10 as it is placed into the import/export element 60 through door 38. Should the cartridge 10 be placed into the import/export element 60 backwards, the firmware together with the microprocessor will activate motor 64 and drive cartridge 10 out of the carriage 62 through door 38. Omron Tateisi Electronics Company of Osaka, Japan, manufactures and markets a suitable photointerruptor 70 designated under the part no. EE-SX461-P11.

Centrally located on base plate 34 above drive 20 is cartridge or media store 80. Store 80 includes vertical side plates 82 and 84 which support plastic guide panels 86 and 88 which oppose each other. Slots 90 are formed by guide panels 86 and 88 and are horizontally oriented for the vertically arranged storage of optical disk cartridges 10. Illustratively, there are ten slots 90 in the media store 80. A plastic bar or storekeeper 92 is mounted by way of steel leaf springs 94 on the left side of the apparatus 30 on vertical side plate 82. Storekeeper 92 simply rests and aligns the cartridges by way of its indexing in the pick notches 12 of the cartridges 10. At the top and bottom of the cartridge store 80 and rearwardly of the front panel 36 is located a discrete optical sensor 96 comprised of an emitter 98 and a receiver or collector 100. Should a cartridge become slightly dislodged outwardly in the cartridge store 80, the emitter 98 signal will not be received by collector 100 and the apparatus 30 will stop operation until all the cartridges 10 are properly oriented completely within the cartridge store 80. General Electric of Auburn, N.Y., manufactures a suitable infrared emitter and collector marketed under part nos. F5D1 and L14G3.

Although cartridge store 80 shows ten slots 90, any number of slots 90 for receiving cartridges 10 may be suitable. The topmost slot 90 is suitably adjacent and planar with the import/export element 60 so that when a cartridge 10 is inserted into the apparatus 30, the cartridge 10 passes through carriage 62 into the top position slot 90 of the cartridge media store 80 by way of the motor 64 and its rubber tire 68. Adjacent the top slot 90 of cartridge store 80 is located a retro-reflective optical sensor 72 which permits the apparatus 30 to know if there is a cartridge 10 within the topmost slot 90 of the cartridge store 80. Honeywell Corporation of Richardson, Tex., appropriately manufactures and markets a retro-reflective sensor under part no. HOA-1180-3.

Again referring to all the figures, the media transport element 120 includes the flipper mechanism 122, picker mechanism 160, lift or locating mechanism 240 and drive loader mechanism 272.

Flipper mechanism 122 has a centerline C about which the flipper mechanism symmetrically rotates. Flipper mechanism 122 is generally comprised of a side "A" cartridge holder plate 124 which has a cartridge guide lip 126 and a slot 127 therein. Side "B" cartridge holder plate 128 also suitably has a cartridge guide lip 130 and a slot 131. Both plates 124 and 128 have opposing plastic guides 132 for retaining the cartridge 10 between plates 124 and 128. Plates 124 and 128 are arranged about the centerline as for symmetrical rotation of the flipper mechanism 122 and cartridge 10. Plates 124 and 128 are connected opposite the media store 80 by machined bar 134.

By this arrangement, a cartridge 10 may be moved into the flipper mechanism 122 with the assistance of guide lips 126 and 13 while the cartridge is retained within the confines of plates 124 and 128 in a sandwich-like manner by way of plastic guides 132. Machine bar 134 supports side "A" pin or flag 136 and side "B" flags or pins 138.

Adjacent bar 134 is bracket 140 which connects to machine bar 134 by way of a bearing assembly 142 and shaft 144. A timing belt 146 is suitably wrapped around the timing pulley 148 connected to shaft 144 and pulley 150. Pulley 150 suitably is attached to shaft 152 of flipper motor 154. A bracket 140 suitably supports another photointerrupter 156 of the type as previously mentioned, such as that made by Sharp. When flipper mechanism 122 is rotated about centerline C, pins 136 and 138 will pass through photointerrupter or optical sensor 156 which will permit the apparatus to know whether side "A" or side "B" is upwardly oriented by counting one pin 136 or two pins 138 interruptions through the sensor 156. Sharp Electronics Corporation of Mahwah, N.J., manufactures and markets suitable photointerrupters for this particular use marketed under part no. GP1A05HR which will permit the apparatus 30 to count the number of flags 136 or 138 which pass through the photo-interrupter 156.

More specifically referring to FIGS. 10-20, the details of the picker mechanism 160 may be observed and appreciated. A picker mechanism bracket 162 supports an upper block guide shaft 164 and a lower block guide shaft 166. A pusher block 168 appropriately has a journaled hole 170 therethrough for lower block guide shaft 166 to pass therethrough. Ears 172 are on top of pusher block 168 to engage and straddle the upper guide shaft 164 to prevent rotation of pusher block 168 about lower block guide shaft 166. Pusher block 168 also has dowel pin hole 174 discussed below. On top of pusher block 168 is located a front pin or puller 176 and a rear pin or pusher 178. On the front pusher block 168 is a cartridge push surface or projection 180 along with a lower picker stop or bar 182. A belt clamp 184 is located on the bottom of pusher block 168 from which extends picker flag 186 having a leading or forward edge 188 and a trailing edge 190.

A picker block 192 is also suitably mounted onto lower block guide shaft 166 by way of hole 194 therethrough. Picker block 192 has a front stop surface 196 and a friction device 198 located within the picker block 192 and about lower guide shaft 166 for controlled frictional and movement of the picker block 192 and pusher block 168 along lower block guide shaft 166. Bal Seal Engineering Company, Inc. of Santa Ana, Calif., manufactures and sells a suitable friction device marketed under the part no. 314MB-106-G. Picker block 192 has a rearwardly directed dowel pin 200 which slides into and out of dowel pin hole 174 to assure alignment of both the pusher and picker blocks 168 and 192 with respect to each other.

Picker 204 is suitably mounted on top of picker block 192 in a rotatable manner by way of pivot pin 206 which may be a shoulder screw with a bearing assembly. Picker 204 includes a pin leg 208 which has an inside surface 210, which may engage front pin 176, and an outside surface 212 which engages rear pin 178. Picker 204 also supports a picker finger 214 which suitably engages and interlocks with the notch 12 of a cartridge 10.

A timing belt 216 suitably passes through the belt clamp 184 of pusher block 168 and is wound around bracket pulley 218 and drive pulley 220. Drive pulley 220 is driven by motor shaft 222 and picker motor 224.

By this arrangement, the cartridge push surface 180 of pusher block 168 may push on a cartridge 10 while rear pin 178 pushes on the outer surface 212 of pin leg 208 to rotate picker 204 out of engagement with notch 12 of cartridge 10. When pusher block 168 is moved in the opposite direction by way of timing belt 216, picker stop or bar 182 catches the front stop surface 196 of picker block 192. Front pin 176 appropriately pulls or hooks inside of the inside surface 210 of picker 204 and rotates the picker finger 214 on shoulder screw 206 into engagement with the notch 12 of a cartridge 10 to pull the cartridge 10 in the same direction as pusher block 168.

Picker mechanism bracket 162 appropriately supports a picker-store photointerrupter or optical sensor 228 adjacent the cartridge store 80 and a picker-home photointerrupter or optical sensor 230 at the other end of picker bracket 162 and somewhat adjacent to machined bar 134 at the picker mechanism's home/retracted position. By this arrangement and as the picker mechanism 160 moves to the store 80, the picker flag 186's leading forward edge 188 will pass through picker-store sensor 228 and stop the movement of timing belt 216. When the picker mechanism 160 is moving in the opposite direction away from the store 80, the trailing edge 190 of the picker flag 186 passes through picker-home sensor 230 and stops the timing belt 216 which will halt the rearward movement of the picker mechanism 160. The apparatus 30 under the control of the microprocessor and firmware within the apparatus 30 may then move the picker mechanism 160 slightly forward to rotate the picker finger 214 out of engagement with notch 12 of the cartridge 10 by way of rear pin 178 engaging the outer surface 212 of the pin leg 208 of picker 204. Optical sensors 228 and 230 appropriately may utilize the above-mentioned photointerrupters by Sharp Electronics Corporation.

The lift or locating mechanism 240 includes mounting plate 242 which is mounted on base plate 34 of the apparatus 30. Motor 244 is supported by mounting plate 242 and has its rotatable shaft 246 passing through mounting plate 242 and suitably fixed in drive pulley 248. Opposing pulley 248 is plate pulley 250 at the top of the lift mechanism 240 around which lift belt 252 is situated. Lift block or bracket 254 is appropriately mounted on picker bracket 162 and has a bearing assembly through which a hard, smooth vertical shaft 258 passes. A belt clamp 260 appropriately entraps the lift belt 252 so that lift block 254 and picker bracket 162 moves upwardly and downwardly with the rotation of lift belt 252.

At the opposite end of picker mechanism bracket 162 from the flipper mechanism 122 is lift-home flag 226 which suitably will interrupt the lift-home photointerrupter 262 appropriately mounted at the top of the cartridge store 80 on vertical plate 84. When this occurs, the lift mechanism 240 is at its topmost position and this information is saved by the apparatus 30. Also at that end of picker mechanism bracket 162 is located a lift position opto or photointerrupter 264. Within the beam of sensor 264 is located a vertically oriented lift position photographic process code strip 268 which is adjustably mounted on the store position code plate or bracket 266 adjoining vertical side plate 84 by clamp screws 270. Code strip 268 has black horizontal bars as shown thereon. The code strip 268 is vertically adjustable to coincide with the slots 90 within store 80 so that the lift mechanism 240 appropriately stops the media transport element 120, particularly the flipper mechanism 122 and picker mechanism 160, at the appropriate position suitably to coincide with a particular slot 90.

Just below code strip 268 is located drive position flag 269 which is adjustably mounted to store position code plate or bracket 266 adjoining vertical side plate 84 and held thereat by clamp screws 271. Drive position flag 269 adjustably stops the media transport element 120 in front of slot 26 of drive 20.

Be it known the lift mechanism is also called a locating mechanism because the flipper and picker mechanisms in some configurations may be laterally moved instead of vertically moved as shown. The locating mechanism may be oriented for either lateral or vertical movement.

Below the picker mechanism 160 and in front of the optical disk drive 20, which is mounted within plates 82 and 84 of the store 80, is located the drive loader mechanism 272. An adjustable bracket 274 is mounted on base plate 34 and supports a drive loader motor 276. The motor 276 rotates shaft 278 upon which are located load arm 280 and load arm flag 284. Below load arm 280 is an adjustable stop 282. Load arm flag 284 appropriately has a retracted edge 286 and an extended edge 288 which will pass through the load arm photointerrupter 290 which will stop and reverse motor 276. By this arrangement, load arm 280 may be rotated up through the slots 127 and 131 of the flipper mechanism 122 after the picker mechanism 160 has moved the cartridge 10 until leading edge 188 of flag 186 has interrupted sensor 228 after which the load arm 280 pushes the cartridge 10 into the optical disk drive 20 and then returns to its retracted position.

In operation, the apparatus 30 is initially hooked up to a host computer by SCSI connectors 52. However, several of the apparati 30 may be daisy-chained together. After power has been fed to the apparatus 30 through power plug 46, the power switch 50 is turned on which will also turn on fan 48 to cool the apparatus 30. Apart from the apparatus being controlled by a host computer by way of common command set commands, the apparatus 30 includes control electronics (not shown) such as printed wire assemblies, firmware and switch panels. A microprocessor or microcontroller may be operatively used by way of a microcode routine which receives sensor inputs, RAM and EPROM memory to control the DC motors and their motor drivers circuits. Appropriately with the power to the apparatus 30 turned on, the apparatus initializes by way of the lift mechanism 240 lifting the picker mechanism bracket 162 until the lift-home sensor 262 is tripped by way of the lift-home flag 226 located on the end of the picker mechanism bracket 162. Thereafter, the apparatus 30 is familiar with the exact location of all slots 90 by way of the lift position photographic process code strip 268 adjustably mounted with respect to lift position sensor 264.

Assuming that there are several cartridges 10 located within the cartridge store 80 of the apparatus 30, the import/export element 60 may receive a new cartridge 10 through door 38. The new cartridge 10 may be located to the top slot 90 position of the store 80 by way of the import/export element 60. Thereafter, the media transport element 120 will have the flipper mechanism 122 and the picker mechanism bracket 162 properly vertically positioned in front of the store 80 for access to a particular cartridge 10 (FIG. 9).

Figure 18:
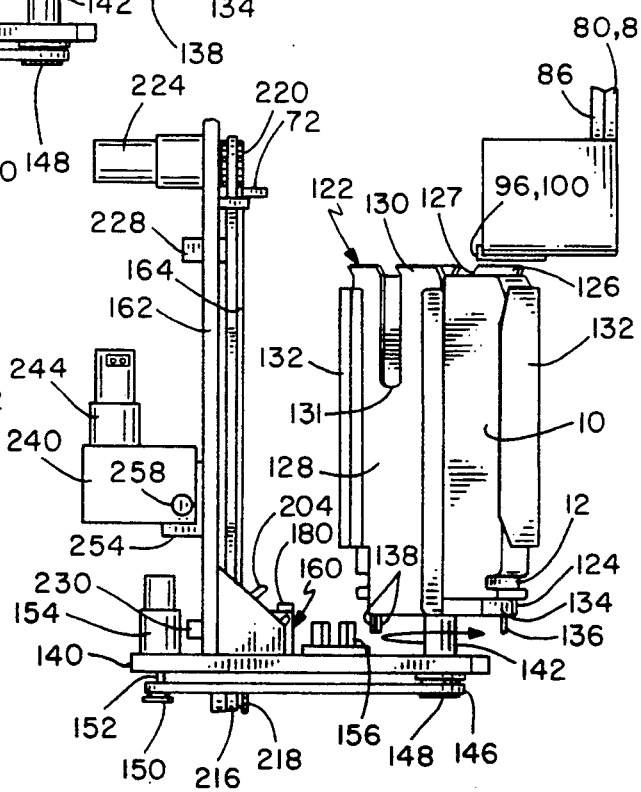
FIG. 18 is a top plan view of the media transport element with a cartridge and the flipper mechanism being rotated.
Figure 19:
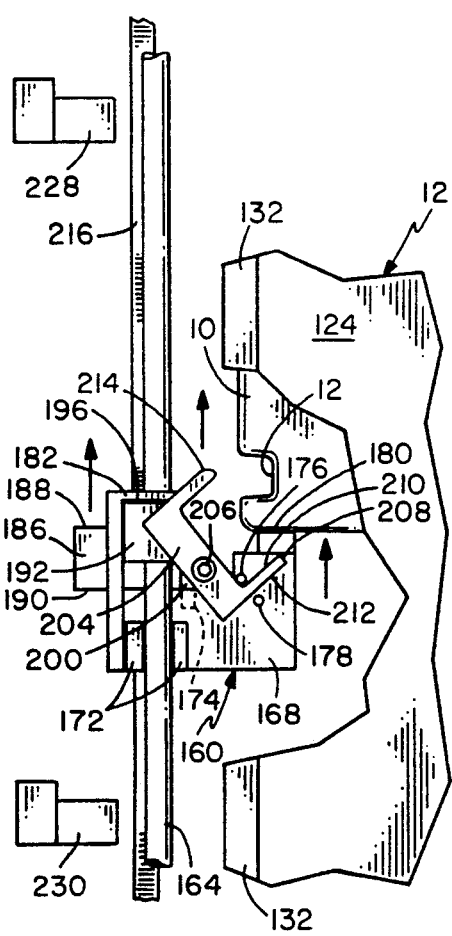
FIG. 19 is an enlarged view of the picker mechanism pushing a cartridge out of the flipper mechanism.

Thereafter, the picker mechanism 160 is initiated to approach a particular cartridge within the store 80 or drive 20 and pick the cartridge with a picker 204 (FIGS. 10-17). Next, the flipper mechanism 122 may or may not flip the cartridge 10 depending upon whether side "A" or side "B" of cartridge 10 is desired to be positioned upward (FIG. 18). Thereafter, the flipper mechanism 122 is again vertically located in front of the drive 20 or the store 80 after which the pusher block 168 moves the cartridge into its desired location (FIG. 19). When a cartridge 10 is to be inserted into the drive 20, the picker mechanism 160 pushes the cartridge into the drive 20 until sensor 228 is tripped. Thereafter, the drive loader mechanism 272 further inserts the cartridge 10 into the slot 26 of drive 20 and then returns load arm 280 to its retracted position (FIGS. 23 and 24).

After the cartridge 10 has been read or written upon in the drive 20, it may be ejected and picked from the drive 20 as it is drawn back into the flipper mechanism 122 by the picker mechanism 160. Thereafter, the cartridge may either be flipped or inverted, returned to the store 80, or returned to the top position slot 90 from which the cartridge may be removed from the apparatus 30 by way of the import/export element 60.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. An optical disk cartridge handling apparatus for storing, handling, reading and writing of optical disks stored in cartridges which store data for a host computer, comprising:
    (a) an import/export element for loading and unloading the cartridge in the apparatus;
    (b) a cartridge store with slots therein for storing the cartridges;
    (c) a flipper mechanism adapted to receive one of the cartridges to invert the cartridge and to locate the cartridge between adjacent the cartridge store and an optical disk drive with a cartridge slot; and
    (d) a block guide shaft adjacent and along the flipper mechanism;
    (e) a pusher block slidably mounted on the shaft being adapted to push the cartridge out of the flipper mechanism;
    (f) a picker mechanism comprised of a cartridge pusher block for pushing the cartridge out of the flipper mechanism and a rotatable picker slidably connected to the shaft adjacent the pusher block, the picker being engaged by the pusher block to rotate the picker away from engagement with the cartridge when the pusher block pushes the cartridge and to rotate the picker into engagement with the cartridge when the pusher block is moved away from the cartridge for pulling the cartridge into the flipper mechanism.

2. The optical disk cartridge handling apparatus of claim 1, wherein the cartridge store and the optical disk drive are located adjacent and in line with respect to each other for receiving a cartridge from the picker and flipper mechanism.

3. The optical disk cartridge handling apparatus of claim 2, further comprising a locating mechanism which raises and lowers the flipper mechanism and the picker mechanism and optical sensing means for informing the apparatus of the vertical positioning of the flipper and picker mechanisms.

4. The optical disk cartridge handling apparatus of claim 1, wherein the cartridge store and the optical disk drive are vertically oriented with respect to each other.

5. The optical disk cartridge handling apparatus of claim 1, further comprising an optical disk drive loader mechanism in front of the optical disk drive.

6. The optical disk cartridge handling apparatus of claim 1, further comprising optical sensing means for informing the apparatus of the locations and orientations of the cartridges, and the flipper and picker mechanisms.

7. The optical disk cartridge handling apparatus of claim 1, wherein the import/export element is adjacent the top of the cartridge store and comprises a carriage for supporting the cartridge and a drive wheel for moving the cartridge into and out of the carriage and the cartridge store.

8. The optical disk cartridge handling apparatus of claim 7, further comprising optical sensing means to determine the presence and orientation of a cartridge in the import/export element and cartridge store.

9. The optical disk cartridge handling apparatus of claim 1, wherein the cartridge store comprises two vertical guide panels forming slots for receiving and storing cartridges and optical sensing means for determining the dislocation of any cartridge within the store.

10. The optical disk cartridge handling apparatus of claim 1, wherein the flipper mechanism comprises:
   (a) a side "A" cartridge holder plate and a side "B" cartridge holder plate for receiving and holding one of the cartridges in a sandwich-like and secure manner to permit inversion and location of the cartridge;
   (b) means for rotating the plates about a common center line for inverting the cartridge; and
   (c) optical sensing means for determining the spatial orientation of the plates with respect to each other.

11. The optical disk cartridge handling apparatus of claim 10, further comprising a bar connecting the plates, the bar being connected to the rotating means.

12. The optical disk cartridge handling apparatus of claim 11, further comprising a flag on the bar in line with an optical sensor for informing the apparatus of the orientation of the plates.

13. The optical disk cartridge handling apparatus of claim 1, wherein the picker has a finger to engage the cartridge and a leg which contacts two pins on the pusher block to rotate the picker.

14. The optical disk cartridge handling apparatus of claim 1, wherein the picker is rotatably mounted on a picker block which is slidably mounted on the shaft.

15. The optical disk cartridge handling apparatus of claim 14, further comprising a bar connecting the pusher and picker blocks.

16. The optical disk cartridge handling apparatus of claim 14, further comprising a friction device in the picker block about the shaft to frictionally control the movement of the picker block on the shaft.

17. The optical disk cartridge handling apparatus of claim 1, further comprising a flag on the pusher block and an optical sensor adjacent the shaft and in line with the flag for informing the apparatus of the location of the picker mechanism.

18. The optical disk cartridge handling apparatus of claim 1, further comprising a lift mechanism which raises and lowers the flipper and picker mechanisms in front of the cartridge store and disk drive, comprising:
   a) a bracket supporting the flipper and picker mechanisms;
   b) a vertical shaft which slidably supports the bracket;
   c) lift means for moving the bracket up and down the shaft;
   d) a code strip indexable with the slots of the store and a drive flag indexable with the slot of the optical disk drive; and
   e) optical sensor on the bracket in line with the code strip and drive flag for accurate vertical indexing of the flipper and picker mechanisms in front of the store and drive.

19. The optical disk cartridge handling apparatus of claim 1, further comprising an optical disk drive loader mechanism in front of the optical disk drive, comprising:
   a) a shaft and a means for rotating the shaft;
   b) a load arm mounted on the shaft for pushing a cartridge into the drive;
   c) a flag on the shaft; and
   d) an optical sensor in line with the flag for informing the apparatus of the position of the load arm.

20. The optical disk cartridge handling apparatus of claim 1, further comprising a locating mechanism which moves the flipper and picker mechanisms together in front of the cartridge store and disk drive, comprising:
   a) a bracket supporting the flipper and picker mechanisms;
   b) a shaft which slidably supports the bracket; and
   c) locating means for moving the bracket up and down the shaft.

* * * * *